UNITED STATES PATENT OFFICE.

ANTHONY WANNER, OF CHICAGO, ILLINOIS.

IMPROVEMENT IN COMPOSITIONS FOR PAVEMENTS.

Specification forming part of Letters Patent No. 134,112, dated December 17, 1872.

*To all whom it may concern:*

Be it known that I, ANTHONY WANNER, of Chicago, in the county of Cook and State of Illinois, have invented a certain Improved Fire-Proof and Water-Proof Concrete for Floors, Paving, and other purposes, of which the following is a specification:

The nature of my invention consists in the production of a quick-setting concrete of a nature calculated to remain unaffected by the extreme heat of summer as well as the frosts of winter. It is composed of one volume of a mortar, consisting of a mixture of plaster of Paris and water, and an equal volume of ashes or cinders, or their equivalents.

To prepare the concrete, dissolve a quantity of plaster of Paris in water sufficient to make a mortar of about the consistency of cream. In the preparation of this mixture care should be taken to let the plaster of Paris lie in the water until all the air has escaped from it, after which it may be stirred and thoroughly mixed with the water. To one volume of this mortar add an equal volume of coal-ashes or furnace-cinders. The component parts must be quickly stirred, and the compound thus formed must be immediately applied, as it very quickly hardens into a concrete form. For the coal-ashes or cinders the following compound may be substituted, it containing all the elements which make the coal-ashes or cinders valuable in this connection. This compound is prepared by the mixture, in a pulverized state, of three parts of alumina silicate, two parts of magnesia, and one part of carbonate of lime and soda.

This concrete is of particular value in the construction of submarine foundations and the like, as it will harden under water. Its quick-setting property, and the tendency of plaster of Paris to expand in drying does away with the loss of time attendant upon the use of other slow-setting compounds in constructing buildings, roofs, floors, ceilings, pavements, &c., therewith.

The coal-ashes being obtainable for the mere cost of cartage from factories and furnaces, and sulphate of lime being a comparatively cheap material, it will be perceived that, in economy of first cost, it can scarcely be excelled by any concrete yet known; besides, its preparation is attended with very little expense.

What I claim as my invention, and desire to secure by Letters Patent, is—

A compound prepared by mixing plaster of Paris dissolved in water with coal-ashes or cinders, or their herein-described equivalents, substantially in the proportions and for the purposes specified.

In testimony whereof I have signed my name to this specification in the presence of two subscribing witnesses.

ANTHONY WANNER.

Witnesses:
MARX WINEMAN,
H. T. LEEPLEL.